United States Patent
Tseng

(10) Patent No.: US 9,007,349 B2
(45) Date of Patent: Apr. 14, 2015

(54) WRITING DEVICE HAVING LIGHT EMITTING DIODE DISPLAY PANEL

(71) Applicant: Hon Hai Precision Industry Co., Ltd., New Taipei (TW)

(72) Inventor: Yung-Chang Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 26 days.

(21) Appl. No.: 13/973,978

(22) Filed: Aug. 22, 2013

(65) Prior Publication Data

US 2014/0145950 A1    May 29, 2014

(30) Foreign Application Priority Data

Nov. 29, 2012 (TW) .............................. 101144831 A

(51) Int. Cl.
*G09G 3/22* (2006.01)
*G06F 3/03* (2006.01)

(52) U.S. Cl.
CPC .................................... *G06F 3/0308* (2013.01)

(58) Field of Classification Search
CPC .......................... G06F 3/0308; H01L 27/3211
USPC ................................ 178/19.05; 345/180–183
See application file for complete search history.

(56) References Cited

U.S. PATENT DOCUMENTS

2014/0133134 A1* 5/2014 KIM et al. ..................... 362/109
2014/0145944 A1* 5/2014 Chang ............................. 345/157

* cited by examiner

*Primary Examiner* — Michael Pervan
(74) *Attorney, Agent, or Firm* — Novak Druce Connolly Bove + Quigg LLP

(57) ABSTRACT

A writing device includes an emitter and a light emitting diode display panel. The light emitting diode display panel includes an array and a receiver. The array has a plurality of pixels each including a first light source, a second light source, a third light source, a driving circuit and a light detecting device. The light detecting device is configured to receive the control signal from the emitter and transmit the control signal to the driving circuit to turn on the pixel. The receiver is electrically connected with the driving circuit. The receiver is configured to receive at least one of the first selective signal, the second selective signal and the third selective signal and transmit it to the driving circuit to turn on at least a corresponding one of the first light source, the second light source, and the third light source.

18 Claims, 3 Drawing Sheets

WRITING DEVICE HAVING LIGHT EMITTING DIODE DISPLAY PANEL

BACKGROUND

1. Technical Field

The disclosure generally relates to writing devices, and particularly to an electronic blackboard having a light emitting diode display panel.

2. Description of Related Art

Conventionally, a plurality of information is chalked on a blackboard. A lot of dust is generated when writing the chalked information on or erasing the chalked information from the blackboard. The dust not only pollutes the environments, but also is harmful to human health.

What is needed, therefore, is a writing device having a light emitting diode display panel to overcome the above described disadvantages.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

An embodiment of a writing device will now be described in detail below and with reference to the drawings.

Figure 1:
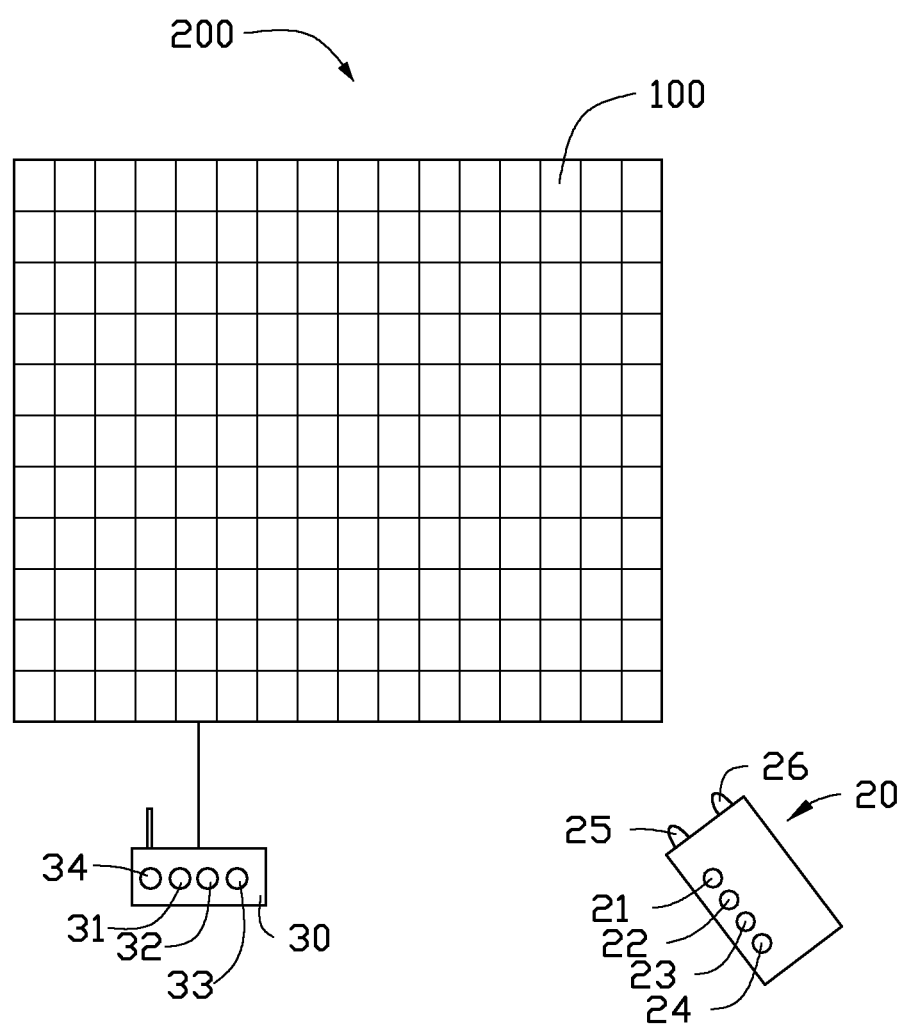
FIG. 1 is an illustrating view showing a writing device in accordance with an embodiment of the present disclosure.
Figure 2:
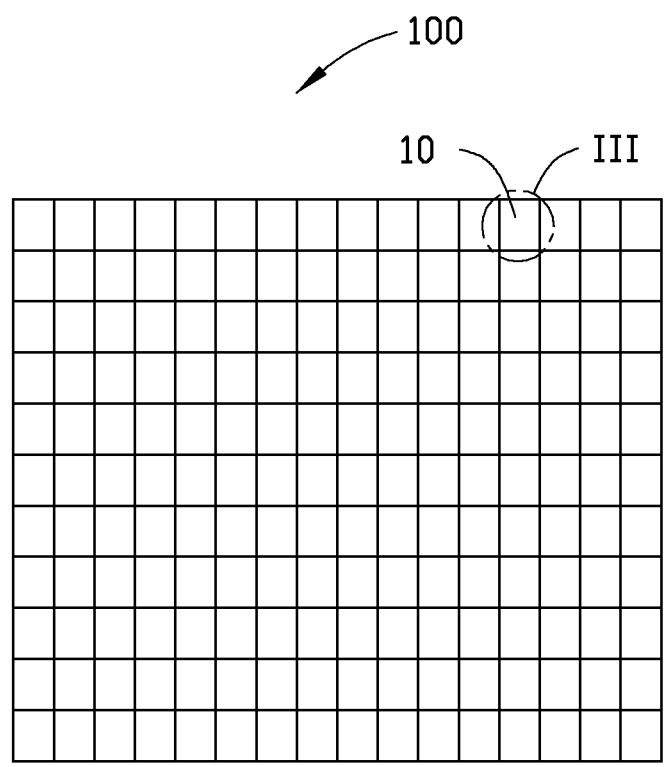
FIG. 2 is an illustrating view of a light emitting diode display panel of the writing device in FIG. 1.
Figure 3:
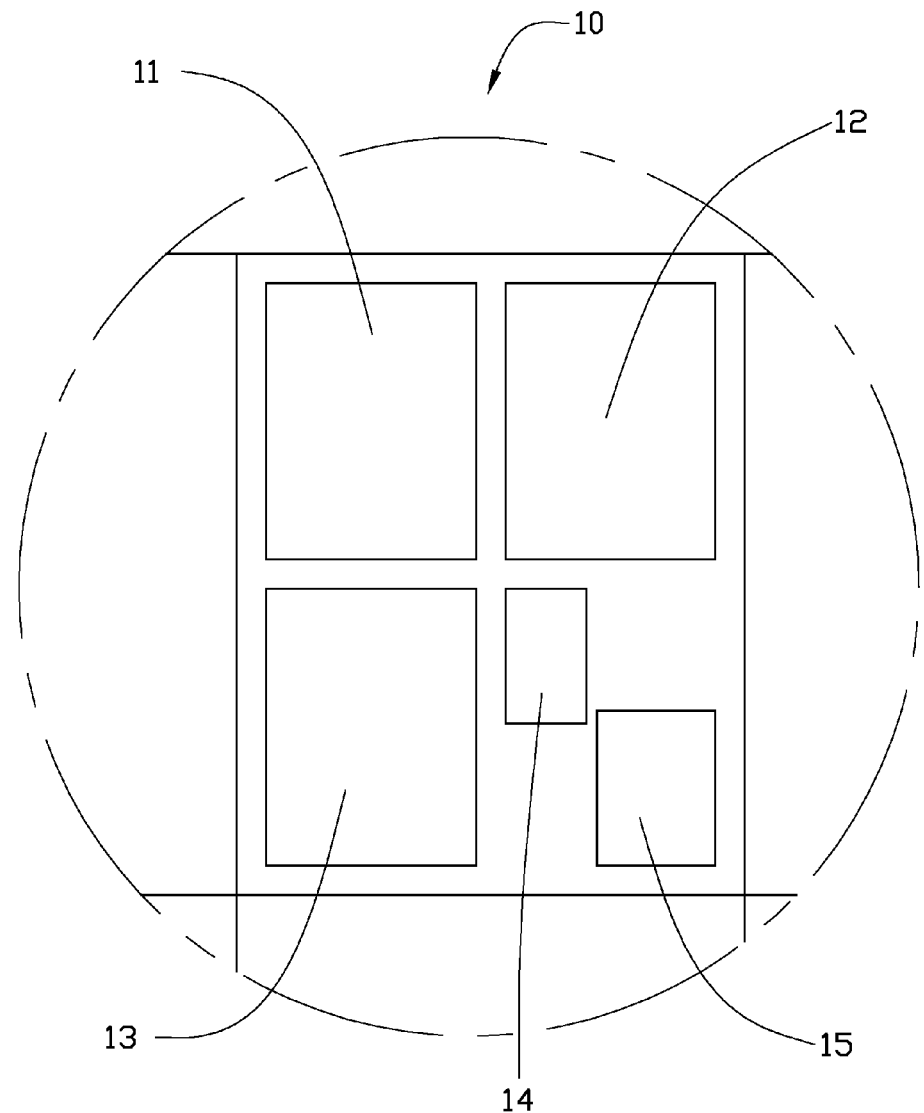
FIG. 3 is an enlarged view of a part of the light emitting diode display panel in FIG. 2.

Referring to FIG. 1, the writing device which is an electronic blackboard includes a light emitting diode display panel 200 and an emitter 20 to write words/marks on the light emitting diode display panel 200. Referring also to FIGS. 2-3, the light emitting diode display panel 200 includes an array 100 having a plurality of pixels 10 arranged in a matrix, and a receiver 30. The number of the pixels 10 is determined by an area of the light emitting diode display panel 200. An increase of the number of the pixels 10 will improve a viewing quality of the light emitting diode display panel 200.

Each of the pixels 10 includes a first light source 11, a second light source 12, a third light source 13, a driving circuit 14 and a light detecting device 15. In this embodiment, the first light source 11 emits red light, the second light source 12 emits green light and the third light source 13 emits blue light. The light detecting device 15 is configured to receive a control signal from the emitter 20 and transmit the control signal to the driving circuit 14 to turn on the pixel 10.

The receiver 30 is electrically connected with the driving circuit 14. The receiver 30 includes a first receiving terminal 31, a second receiving terminal 32, a third receiving terminal 33 and a fourth receiving terminal 34. The first receiving terminal 31 receives a first selective signal from the emitter 20 and transmits the first selective signal to the driving circuit 14 to turn on the first light source 11 when the light detecting device 15 of the corresponding pixel 10 has received the control signal to turn on. The second receiving terminal 32 receives a second selective signal from the emitter 20 and transmits the second selective signal to the driving circuit 14 to turn on the second light source 12, when the light detecting device 15 of the corresponding pixel 10 has received the control signal to turn on. The third receiving terminal 33 receives a third selective signal from the emitter 20 and transmits the third selective signal to the driving circuit 14 to turn on the third light source 12, when the light detecting device 15 of the corresponding pixel 10 has received the control signal to turn on. The fourth receiving terminal 34 receives an erasing signal from the emitter 20 and transmits the erasing signal to the driving circuit 14 to turn off the lightened pixel 10.

The emitter 20 includes a first selective button 21, a second selective button 22, a third selective button 23, a fourth selective button 24, a first emitting terminal 25 and a second emitting terminal 26. The first emitting terminal 25 generates the first selective signal when the first selective button 21 is pressed down. The first emitting terminal 25 generates the second selective signal when the second selective button 22 is pressed down. The first emitting terminal 25 generates the third selective signal when the third selective button 23 is pressed down. The first emitting terminal 25 generates the erasing signal when the fourth selective button 24 is pressed down. The second emitting terminal 26 generates the control signal to the light detecting device 15. The light detecting device 15 receives the control signal and transmits the control signal to the driving circuit 14 to turn on the pixel 10. In this embodiment, the first selective signal, the second selective signal, the third selective signal and the fourth selective signal of the first emitting terminal 25 and the control signal of the second emitting terminal 26 are infrared light with different frequencies. When the emitter 20 moves in front of the light emitting display panel 200, the pixels 10 receive the control signal from the second emitting terminal 26 will be sequentially turned on to illustrate a moving track of the control single from the emitter 20 on the light emitting diode display panel 200. A color of the light emitted by each of the pixels 10 can be selective by pressing down the first selective button 21, the second selective button 22, or the third selective button 23. When the first selective button 21 is pressed down, only the first light source 11 is turned on to make the pixel 10 emit red light. When the second selective button 22 is pressed down, only the second light source 12 is turned on to make the pixel 10 emit green light. When the third selective button 23 is pressed down, only the third light source 13 is turned on to make the pixel 10 emit blue light. When the first selective button 21, the second selective button 22 and the third selective button 23 are pressed down at the same time, all of the first light source 11, the second light source 12 and the third light source 13 are turned on to make the pixel 10 emit a white light. In this embodiment, the frequencies of the control signal, the first selective signal, the second selective signal, the third selective signal and the erasing signal are different from each other. Therefore, the control signal, the first selective signal, the second selective signal, the third selective signal and the erasing signal will not be influenced (interfered) by each other. In an alternative embodiment, the light intensities of the control signal, the first selective signal, the second selective signal, the third selective signal and the erasing signal are different from each other to avoid light from the first emitting terminal 25 and the second emitting terminal 26 from being influenced (interfered) by each other.

When the fourth button 24 is pressed down, the second emitting terminal 26 generates the erasing signal to the receiver 30. The fourth receiving terminal 34 of the receiver 30 receives the erasing signal and transmits the erasing signal to the driving circuit 14. According to the erasing signal, the driving circuit 14 will turn off the pixels 10 which have been activated to emit light.

As described above, the light emitting diode display panel 200 illustrates information according to the moving track of the control signal from the emitter 30 on the light emitting diode display panel 200 to form a writing process. No dust is generated in the writing process. In addition, users can move the emitter 30 in a relatively far distance; it is not necessary to bring the emitter 30 to contact the light emitting diode display panel 200 when writing words/marks on the light emitting diode display panel 200. To facilitate the use of the light emitting diode display panel 200, a writing pen (not shown) which has LEDs for generating green, red and blue light can also be used to activate the pixels 10 to emit light. The writing pen is used to move on the light emitting diode display panel 200 while in contact with light emitting diode display panel 200 to activate the corresponding pixel to emit light, wherein the light generated by the writing pen is detected by the light detecting device 15 to activate a selected LED 11 (12, 13) in the corresponding pixel 10 to generate light having a color the same as that of the light generated by the writing pen.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A writing device, comprising:
    an emitter, having a first emitting terminal and a second emitting terminal, the first emitting terminal being configured to generate a first selective signal, a second selective signal and a third selective signal, the second emitting terminal being configured to generate a control signal; and
    a light emitting diode display panel, comprising:
    an array having a plurality of pixels arranged in a matrix, each pixel comprising a first light source, a second light source, a third light source, a driving circuit and a light detecting device, the light detecting device being used to receive the control signal and transmit the control signal to the driving circuit to turn on a corresponding pixel; and
    a receiver electrically connected with the driving circuit, the receiver being used to receive at least one of the first selective signal, the second selective signal and the third selective signal and transmit it to the driving circuit to turn on at least a corresponding one of the first light source, the second light source, and the third light source when the light detecting device of the corresponding pixel has received the control signal to turn on the corresponding pixel.

2. The writing device of claim 1, wherein the first light source emits red light, the second light source emits green light, and the third light source emits blue light.

3. The writing device of claim 2, wherein when receiving the first selective signal, the receiver transmits the first selective signal to the driving circuit to turn on the first light source to make the corresponding pixel emit red light when the light detecting device receives the control signal.

4. The writing device of claim 2, wherein when receiving the second selective signal, the receiver transmits the second selective signal to the driving circuit to turn on the second light source to make the corresponding pixel emit green light when the light detecting device receives the control signal.

5. The writing device of claim 2, wherein when receiving the third selective signal, the receiver transmits the third selective signal to the driving circuit to turn on the third light source to make the corresponding pixel emit blue light when the light detecting device receives the control signal.

6. The writing device of claim 2, wherein when receiving all of the first selective signal, the second selective signal and the third selective signal, the receiver transmits the first selective signal, the second selective signal and the third selective signal to the driving circuit to turn on all of the first light source, the second light source and the third light source to make the pixel emit white light when the light detecting device receives the control signal.

7. The writing device of claim 1, wherein the emitter further comprises a first selective button, a second selective button and a third selective button, the first emitting terminal generates the first selective signal when the first selective button is pressed down, the first emitting terminal generates the second selective signal when the second selective button is pressed down, the first emitting terminal generates the third selective signal when the third selective button is pressed down.

8. The writing device of claim 7, wherein the emitter further comprises a fourth selective button, when the fourth selective button is pressed down, the first terminal of the emitter generates an erasing signal, and the receiver receives the erasing signal and transmits the erasing signal to the driving circuit to turn off at least a pixel which has been turned on.

9. The writing device of claim 1, wherein the first selective signal, the second selective signal, the third selective signal and the control signal have different frequencies.

10. The writing device of claim 1, wherein the first selective signal, the second selective signal, the third selective signal and the control signal are infrared light.

11. A light emitting diode display panel, comprising:
    an array having a plurality of pixels arranged in a matrix, each pixel comprising a first light source, a second light source, a third light source, a driving circuit and a light detecting device, the light detecting device being configured to receive a control signal and transmit the control signal to the driving circuit to turn on a corresponding pixel; and
    a receiver electrically connected with the driving circuit, the receiver being configured to receive at least one of a first selective signal, a second selective signal and a third selective signal and transmit it to the driving circuit to turn on at least a corresponding one of the first light source, the second light source, and the third light source when the light detecting device of the corresponding pixel has received the control signal to turn on the corresponding pixel.

12. The light emitting diode display panel of claim 11, wherein the first light source emits red light, the second light source emits green light, and the third light source emits blue light.

13. The light emitting diode display panel of claim 12, wherein when receiving the first selective signal, the receiver transmits the first selective signal to the driving circuit to turn on the first light source to make the corresponding pixel emit red light when the light detecting device receives the control signal.

14. The light emitting diode display panel of claim 12, wherein when receiving the second selective signal, the receiver transmits the second selective signal to the driving circuit to turn on the second light source to make the corresponding pixel emit green light when the light detecting device receives the control signal.

15. The light emitting diode display panel of claim 12, wherein when receiving the third selective signal, the receiver transmits the third selective signal to the driving circuit to turn on the third light source to make the corresponding pixel emit blue light when the light detecting device receives the control signal.

16. The light emitting diode display panel of claim 12, wherein when receiving the first selective signal, the second selective signal and the third selective signal, the receiver transmits the first selective signal, the second selective signal and the third selective signal to the driving circuit to turn on all of the first light source, the second light source and the third light source to make the corresponding pixel emit white light when the light detecting device receives the control signal.

17. The light emitting diode display panel of claim 11, wherein the first selective signal, the second selective signal, the third selective signal and the control signal have different frequencies.

18. The light emitting diode display panel of claim 11, wherein the first selective signal, the second selective signal, the third selective signal and the control signal are infrared light.

\* \* \* \* \*